US008667167B2

(12) United States Patent
Fang

(10) Patent No.: US 8,667,167 B2
(45) Date of Patent: Mar. 4, 2014

(54) METHOD AND NETWORK DEVICE FOR CONTROLLING TRANSMISSION RATE OF COMMUNICATION INTERFACE

(75) Inventor: Qingyin Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 13/550,331

(22) Filed: Jul. 16, 2012

(65) Prior Publication Data
US 2013/0138830 A1 May 30, 2013

Related U.S. Application Data

(63) Continuation of application No. PCT/CN2012/072764, filed on Mar. 22, 2012.

(30) Foreign Application Priority Data

Nov. 28, 2011 (CN) .......................... 2011 1 0384201

(51) Int. Cl.
G06F 15/16 (2006.01)
(52) U.S. Cl.
USPC .............................. 709/233; 370/229; 710/29
(58) Field of Classification Search
USPC .......... 709/231, 233, 234, 235; 370/229, 230, 370/230.1, 231, 232, 233, 234, 235, 236, 370/236.1
See application file for complete search history.

(56) References Cited

U.S. PATENT DOCUMENTS

| | | | | |
|---|---|---|---|---|
| 5,982,813 A * | 11/1999 | Dutta et al. | ................... | 375/219 |
| 6,418,474 B1 * | 7/2002 | Morris | .......................... | 709/233 |
| 6,992,981 B2 * | 1/2006 | Morikawa et al. | ........... | 370/229 |
| 7,085,228 B2 * | 8/2006 | Zaki et al. | ..................... | 370/229 |
| 7,193,966 B2 * | 3/2007 | Gupta et al. | .................. | 370/231 |
| 7,274,661 B2 * | 9/2007 | Harrell et al. | ................. | 370/229 |
| 7,392,322 B2 * | 6/2008 | Ido et al. | ....................... | 709/233 |
| 7,411,901 B1 * | 8/2008 | Alexander et al. | ............ | 370/230 |
| 7,676,238 B2 * | 3/2010 | Otsuka | .......................... | 455/522 |
| 7,864,678 B1 * | 1/2011 | Sampath et al. | ............. | 370/232 |
| 8,095,816 B1 * | 1/2012 | Chan et al. | .................... | 713/324 |
| 8,107,369 B2 * | 1/2012 | Sagfors | ......................... | 370/230 |
| 8,134,988 B2 * | 3/2012 | Banerjea et al. | ............. | 370/338 |
| 8,203,944 B2 * | 6/2012 | Popescu et al. | .............. | 370/230 |
| 8,295,174 B2 * | 10/2012 | Wu et al. | ....................... | 370/233 |

(Continued)

FOREIGN PATENT DOCUMENTS

| CN | 1988569 A | 6/2007 |
|---|---|---|
| CN | 101252520 A | 8/2008 |

(Continued)

*Primary Examiner* — Kostas Katsikis
(74) *Attorney, Agent, or Firm* — Brinks, Gilson & Lione

(57) ABSTRACT

A method for controlling a transmission rate of a communication interface includes detecting, for a plurality of times, data traffic that passes through a first communication interface of a first device within a preset period; when the traffic rates at which the data traffic passes through the first communication interface within the preset period are lower than a first threshold, sending a rate reduction request message to a second device that includes a second communication interface, so that the second device configures a rate of the second communication interface as a first transmission rate that is lower than a current transmission rate of the second communication interface and that is supported by both communication interfaces after receiving the rate reduction request message. In this way, power consumption of the communication interface may be reduced.

14 Claims, 11 Drawing Sheets

(56) References Cited

U.S. PATENT DOCUMENTS

| | | | |
|---|---|---|---|
| 8,356,327 B2 * | 1/2013 | van Beek | 725/105 |
| 8,380,217 B2 * | 2/2013 | Caldwell et al. | 455/453 |
| 8,432,797 B2 * | 4/2013 | Fonseca et al. | 370/230 |
| 8,493,955 B2 * | 7/2013 | Nandagopalan et al. | 370/348 |
| 8,553,540 B2 * | 10/2013 | Mehrotra et al. | 370/230 |
| 2003/0117956 A1 * | 6/2003 | Lee | 370/232 |
| 2004/0203383 A1 * | 10/2004 | Kelton et al. | 455/41.2 |
| 2006/0026295 A1 * | 2/2006 | Iwamura | 709/233 |
| 2008/0117814 A1 * | 5/2008 | Popescu et al. | 370/230 |
| 2009/0204827 A1 | 8/2009 | Diab et al. | |
| 2009/0245108 A1 * | 10/2009 | Wu et al. | 370/233 |
| 2012/0215936 A1 * | 8/2012 | Yang et al. | 709/235 |
| 2012/0324124 A1 * | 12/2012 | Locker et al. | 709/233 |
| 2013/0114497 A1 * | 5/2013 | Zhang et al. | 370/312 |
| 2013/0129350 A1 * | 5/2013 | Koley et al. | 398/45 |

FOREIGN PATENT DOCUMENTS

| | | | |
|---|---|---|---|
| EP | 548939 A2 * | 6/1993 | |
| EP | 767548 A2 * | 4/1997 | |
| EP | 2268087 A2 * | 12/2010 | |
| GB | 2408420 A * | 5/2005 | |
| JP | 2011010031 A * | 1/2011 | |
| WO | WO 9914865 A1 * | 3/1999 | |
| WO | WO 03090427 A1 * | 10/2003 | |

* cited by examiner

US 8,667,167 B2

METHOD AND NETWORK DEVICE FOR CONTROLLING TRANSMISSION RATE OF COMMUNICATION INTERFACE

CROSS-REFERENCE TO RELATED APPLICATIONS

This application is a continuation of International Application No. PCT/CN2012/072764, filed on Mar. 22, 2012, which claims priority to Chinese Patent Application No. 201110384201.2, filed on Nov. 28, 2011, both of which are hereby incorporated by reference in their entireties.

FIELD OF THE APPLICATION

The present application relates to the field of communications, and in particular, to a method and a network device for controlling a transmission rate of a communication interface in the field of communications.

BACKGROUND OF THE APPLICATION

As the Internet protocol (Internet Protocol, IP) technologies spread, Ethernet is more and more widely used in the information and communications technology industry. External service data interfaces of network devices, such as a personal computer, various types of data switches, a server, a media processor, and a router widely use Ethernet interfaces with high generality but low cost. As Ethernet applications widely spread, Ethernet technologies are under constant development. The transmission rate of an Ethernet interface evolves from 10 Mbps to 100 Mbps, 1 Gbps, 10 Gbps, and 40 Gbps, and a 100 Gbps or even higher rate will appear in the future.

As the transmission rate of an Ethernet interface increases, the power consumption of each Ethernet interface constantly increases. For example, the power consumption of a 1 Gbps Ethernet interface increases by more than one time compared with that of a 100 Mbps Ethernet interface. A 1 Gbps Ethernet interface or a 100 Mbps Ethernet interface consumes a considerable amount of power even in an idle state.

Currently applied Ethernet interfaces generally support a multi-rate adaptive capability, for example, supporting a 100 M/100 M/10 M adaptive capability. During working, however, the highest rate mode supported by both parties is generally obtained after automatic negotiation through a rate self-negotiation mode. For example, the Ethernet interface of device A is a 1000 M/100 M adaptive interface, and the Ethernet interface of device B is a 1000 M/100 M/10 M adaptive interface. In this case, the interface transmission rate after negotiation by both parties is 1000 M. That is, even if interface traffic remains low for a long time, the Ethernet interfaces work at the negotiated highest rate, which increases the power consumption of the Ethernet interfaces.

At present, an energy-saving method is proposed in the Energy Efficient Ethernet standard 802.3az: When no data is transmitted, physical layers of two directly connected parties enter into a low power idle (Low Power Idle, LPI) mode to save energy. This mechanism yields favorable energy efficiency when the Ethernet interfaces are in the idle state where no data is transmitted for a long time. However, when the Ethernet interfaces continuously have low traffic, for example, the traffic remains at about 1% of the interface transmission rate, energy cannot be saved because the Ethernet interfaces cannot enter into the low-power LPI mode. As such, the manner for saving energy by entering into the LPI mode has restrictions, and cannot efficiently reduce the power consumption of Ethernet interfaces when data is transmitted between the Ethernet interfaces.

In addition to Ethernet interfaces, other communication interfaces, such as a PCIE (Peripheral Component Interconnect Express, peripheral component interconnect express) interface, an Ethernet SerDes (Serializers and Deserializers, serializers and deserializers) interface, and a wireless CPRI (Common Public Radio Interface, common public radio interface), also encounter the problem of large power consumption. If data is being transmitted on the communication interfaces, the power consumption of the communication interfaces cannot be reduced.

SUMMARY OF THE APPLICATION

The present application provides a method and a network device for controlling a transmission rate of a communication interface to solve the problem in the prior art that the power consumption of the communication interface cannot be efficiently reduced. In the embodiments, the transmission rate of the communication interface is controlled by detecting data traffic, which may reduce the power consumption of the communication interface and save energy.

The present application provides a method for controlling a transmission rate of an Ethernet interface. The method includes:

Detecting, for a plurality of times, data traffic that passes through a first communication interface of a first device within a preset period, where the communication interface supports adjustment among a plurality of transmission rates;

determining a traffic rate of the data traffic that passes through the first communication interface and is obtained through detection;

when the traffic rates determined for a plurality of times within the preset period are lower than a first threshold, sending a rate reduction request message to a second device that includes a second communication interface, so that the second device configures a transmission rate of the second communication interface as a first transmission rate that is lower than a current transmission rate of the second communication interface and is supported by both communication interfaces after receiving the rate reduction request message, where the second communication interface and first communication interface are located at two ends of a link for data transmission, respectively; and receiving a rate reduction response message of agreeing to use the first transmission rate, where the rate reduction response message is sent by the second device after receiving the rate reduction request message; and configuring a transmission rate of the first communication interface as the first transmission rate after receiving the rate reduction response message.

In another aspect, the present application further provides a network device, including:

a first communication interface circuit, configured to connect to a second communication interface circuit of a peer device and transmit data through the communication interface circuits, where the first communication interface circuit and the second communication interface circuit support adjustment among a plurality of transmission rates;

a traffic detecting circuit, configured to detect, for a plurality of times, data traffic that passes through the first communication interface circuit within a preset period;

a rate determining circuit, configured to determine a traffic rate of the data traffic that passes through the first communication interface and is obtained through detection; and a rate adjusting circuit, configured to, when the traffic rates determined for a plurality of times within the preset period are lower than a first threshold, send a rate reduction request message through the first communication interface circuit to the peer device, so that the peer device configures a transmission rate of the second communication interface as a first transmission rate that is lower than a current transmission rate of the second communication interface and is supported by both communication interface circuits, after the peer device receives the rate reduction request message;

where the rate adjusting circuit is further configured to receive, through the first communication interface circuit, a rate reduction response message of agreeing to use the first transmission rate, where the rate reduction response message is sent by the peer device after receiving the rate reduction request message; and configure a transmission rate of the first communication interface as the first transmission rate after receiving the rate reduction response message.

According to the technical solutions, the traffic rate of the communication interface may be determined by detecting the data traffic of the communication interface, and the transmission rate of the communication interface is reduced when multiple traffic rates determined with the preset period are lower than the first threshold. The power consumption is low when a low transmission rate is used, so in the embodiments, the power consumption of the communication interface may be reduced and energy may be saved, by reducing the transmission rate of the communication interface. In this way, even if data is being transmitted on the communication interface, the transmission rate of the communication interface can still be reduced to save energy, avoiding a case where the transmission rate of the communication interface is always in a state of high power consumption when data is being transmitted.

BRIEF DESCRIPTION OF THE DRAWINGS

To make the technical solutions clearer, the accompanying drawings for illustrating the embodiments or the prior art are briefly described below. Apparently, the accompanying drawings are merely about some embodiments, and persons of ordinary skill in the art may derive other accompanying drawings from such accompanying drawings without any creative effort.

DETAILED DESCRIPTION OF THE EMBODIMENTS

The technical solutions under the present application are elaborated below with reference to the accompanying drawings. Evidently, the embodiments described below are for the exemplary purpose only, without covering all embodiments. Those skilled in the art can derive other embodiments from the embodiments given herein without making any creative effort, and all such embodiments are covered in the protection scope of the claims.

First, a method 100 for controlling a transmission rate of a communication interface according to an embodiment is described with reference to FIG. 1.

Figure 1:
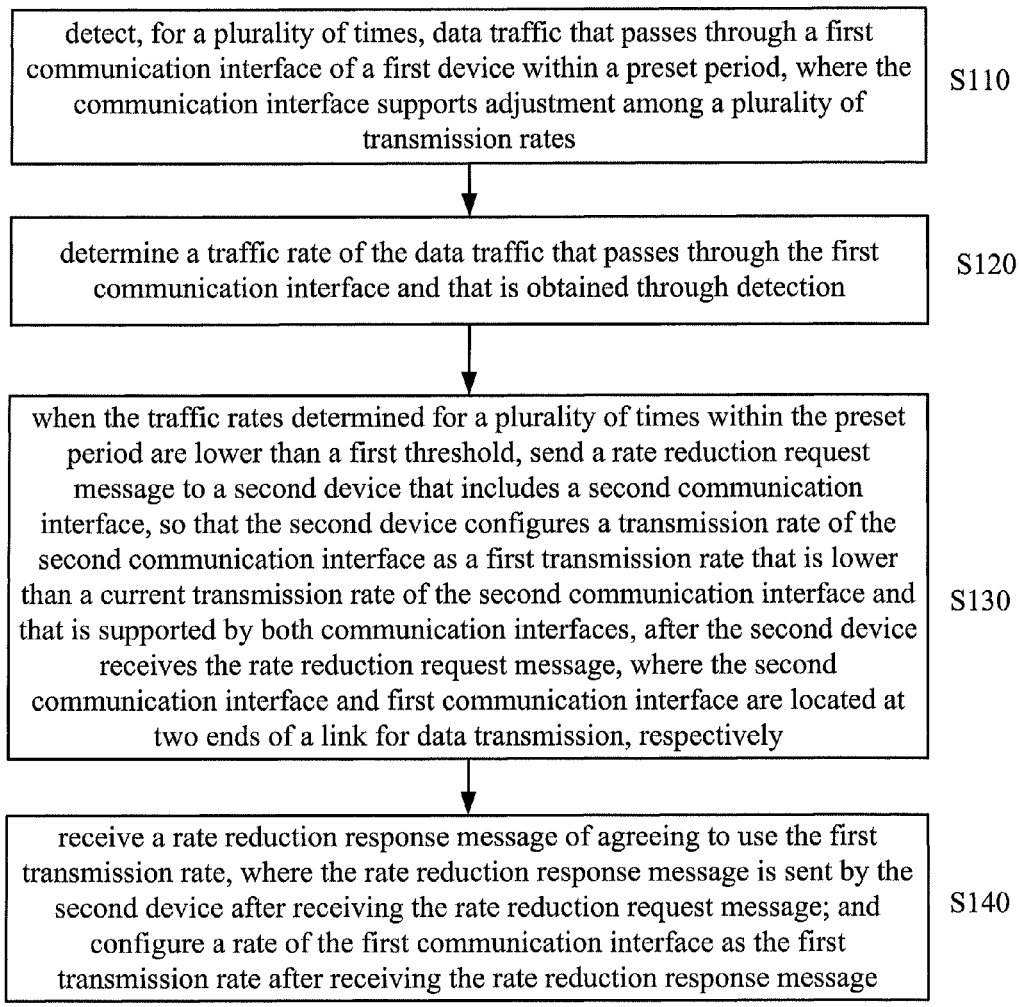
FIG. 1 is a flowchart of a method for controlling a transmission rate of a communication interface according to an embodiment.

As shown in FIG. 1, the method 100 includes the following steps:

In S110, detect, for a plurality of times, data traffic that passes through a first communication interface of a first device within a preset period, where the communication interface supports adjustment among a plurality of transmission rates.

In S120, determine a traffic rate of the data traffic that passes through the first communication interface and that is obtained through detection.

In S130, when the traffic rates determined for a plurality of times within the preset period are lower than a first threshold, send a rate reduction request message to a second device that includes a second communication interface, so that the second device configures a transmission rate of the second communication interface as a first transmission rate that is lower than a current transmission rate of the second communication interface and that is supported by both communication interfaces, after the second device receives the rate reduction request message, where the second communication interface and first communication interface are located at two ends of a link for data transmission, respectively.

In S140, receive a rate reduction response message of agreeing to use the first transmission rate, where the rate reduction response message is sent by the second device after receiving the rate reduction request message; and configure a rate of the first communication interface as the first transmission rate after receiving the rate reduction response message.

The method 100 may be executed by the first device. The first device is directly connected to the second communication interface on the second device by using the first communication interface on the first device. Both communication interfaces use the same transmission rate for data transmission. The first transmission rate is one of at least two transmission rates supported by the communication interfaces. The communication interfaces may select one from the supported transmission rates for data transmission.

The first device may detect, for a plurality of times, data traffic that passes through the first communication interface within the preset period, and calculate the traffic rate within this period according to the data traffic (the traffic rate can be obtained by dividing traffic by time t). For example, the data traffic may be detected once every two seconds within five minutes (the preset period), and then the traffic rate in every two seconds is determined (the traffic rate is obtained by dividing the detected data traffic by two seconds), or detection may be implemented for a plurality of times according to another preset policy (for example, implement detection after one second, then implement detection again after two seconds, then implement detection again after one second, then implement detection again after two seconds . . . ). The purpose of implementing detection for a plurality of times is to accurately reflect actual data traffic (for example, reflecting that the data traffic within a relatively long period remains low), so that a correct policy is drawn up for subsequent adjustment, to avoid an error brought by only one detection.

For the ease of description, a "rate" described in this embodiment and in subsequent embodiments refers to a "transmission rate" unless specified as a "traffic rate". For example, a "rate of the first communication interface" below indicates a "transmission rate of the first communication interface".

If multiple traffic rates determined for a plurality of times within the preset period are all lower than the first threshold, it may be indicated that the rate used by the first communication interface and the second communication interface is high for current data traffic. Therefore, the rate of the first communication interface and second communication interface may be reduced, so that normal data transmission is continued to be performed at the reduced rate. As a low transmission rate results in low power consumption, power consumption may be reduced by reducing the transmission rate to save energy.

It should be noted that "multiple traffic rates are all lower than the first threshold" in this embodiment does not confine that each traffic rate is lower than the first threshold strictly. Selection of multiple traffic rates illustrated in the above is to better reflect the actual traffic. Those skilled in the art may easily learn that, when the number of detected traffic rates is large, if one or several traffic rates are not lower than the first threshold, the decision for adjusting a rate may still be made (for example, if among 500 times of detection, the traffic rates detected in two times are slightly higher than the first threshold value, it may still be deemed that the data traffic in this period is little, and therefore the decision for reducing the transmission rate is made). Another equivalent judgment policy for judging the actual traffic and making a corresponding decision is not confined herein. In this embodiment, the rate of the communication interface is reduced only when all traffic rates within the preset period are lower than the first threshold, which can reduce a judgment error as much as possible and provide a favorable judgment basis for subsequent policy adjustment.

In addition, the "first threshold" in this embodiment is a value drawn from experiences. For example, when this solution is used for Ethernet rate adjustment and the Ethernet supports three rates: 10 Mbps, 100 Mbps, and 1000 Mbps, 3% (a value drawn from experiences) of the maximum rate (1000 Mbps) may be used as the first threshold, or a "first threshold" is separately set for each rate (except the lowest rate). Meanwhile, those skilled in the art can easily learn that this value needs to be lower than a next transmission rate to be reduced. For example, if a current transmission rate is 100 Mbps, and the next transmission rate to be reduced is 10 Mbps, then the first threshold needs to be lower than 10 Mbps; otherwise if the first threshold is a value (for example, 15 Mbps) larger than the next transmission rate, the traffic rate may be larger than 10 Mbps, and the next transmission rate cannot meet a data transmission requirement (for example, the loss of a large number of packets occurs).

According to the method for controlling the transmission rate of the communication interface provided in this embodiment, by reducing the rate of the communication interface when a plurality of traffic rates determined within a preset period are lower than the first threshold, the power consumption of the communication interface may be reduced, and energy may be saved; in addition, when data is being transmitted on the communication interface in this embodiment, energy can still be saved by reducing the rate of the communication interface, thereby solving the problem in the prior art that the communication interface is always in a state of high power consumption when data is being transmitted. Meanwhile, in this embodiment, data transmission and communication are not shut down. Therefore, services can still be performed when power consumption is reduced, to better meeting service requirements.

Figure 2A:
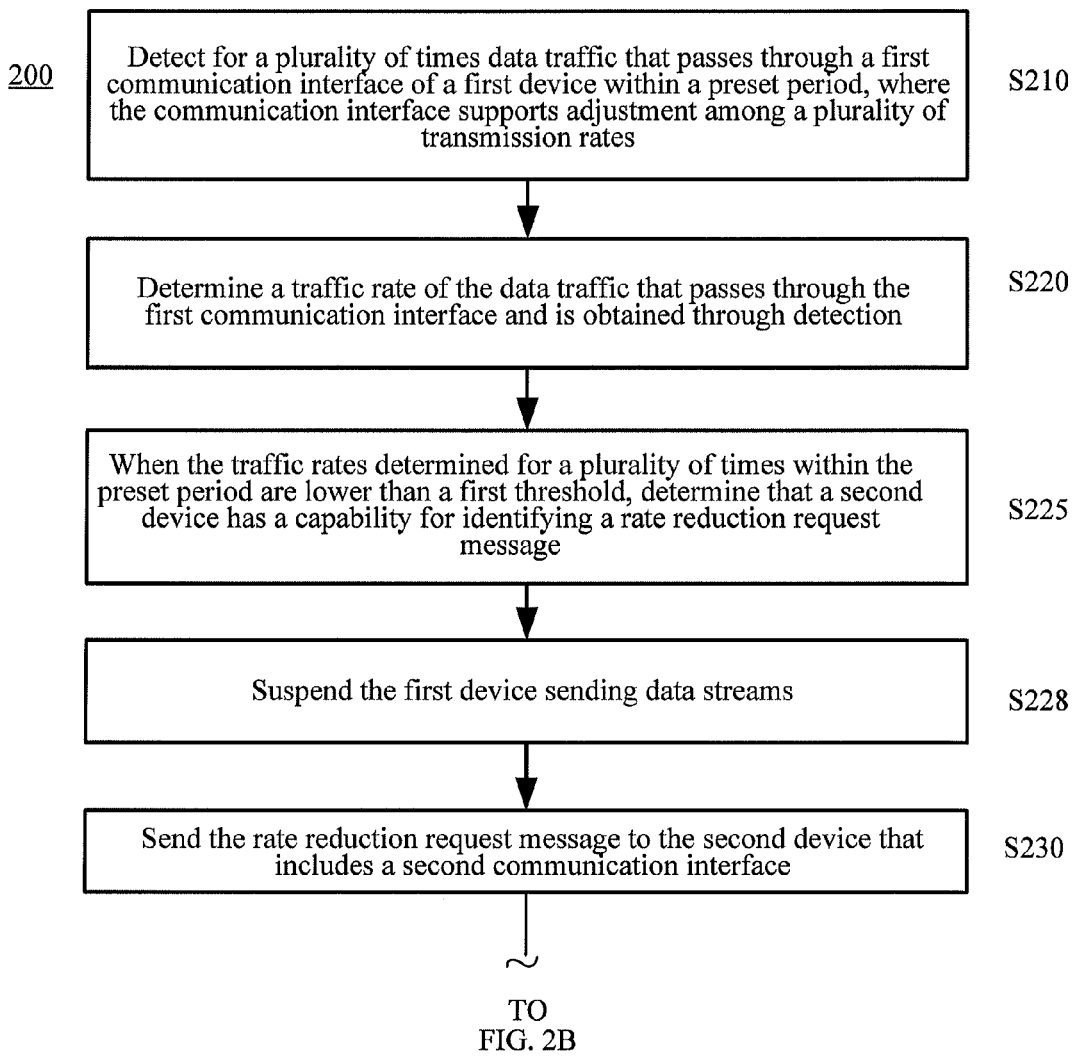
FIG. 2A and FIG. 2B are flowcharts of another method for controlling a transmission rate of a communication interface according to an embodiment.
Figure 2B:
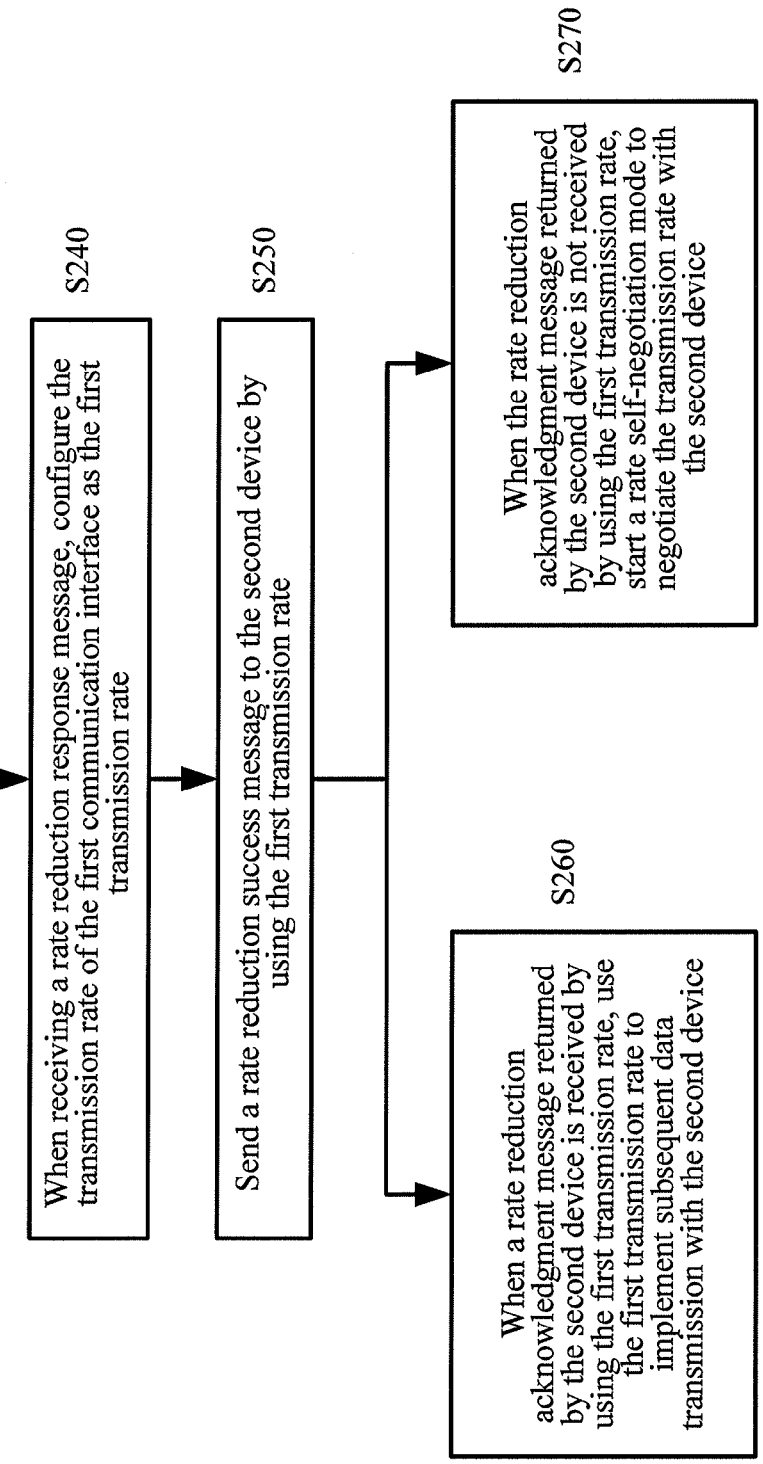

FIG. 2 is a flowchart of a method 200 for controlling a transmission rate of a communication interface according to an embodiment. A major difference between the method 200 and the method 100 is as follows: In the method 200, after configuring the first transmission rate, the first device further needs to determine whether the second device succeeds in adjusting the rate, to correctly perform subsequent data transmission. S210 to S240 in the method 200 are basically the same as S110 to S140 in the method 100.

In S250, use the first transmission rate to send a rate reduction success message to the second device, where the rate reduction success message is used to indicate that the first device successfully configures the transmission rate of the first communication interface as the first transmission rate.

After configuring the first transmission rate for the first communication interface, the first device uses the first transmission rate to send the rate reduction success message to the second device. If the second device successfully reduces the rate after receiving the rate reduction request message, the second device may receive the rate reduction success message and determines that the first device succeeds in changing the rate.

According to an embodiment, after S250, S260 may be included. In S260, when a rate reduction acknowledgment message returned by the second device as a response to the rate reduction success message is received by using the first transmission rate, use the first transmission rate to perform subsequent data transmission with the second device, where the rate reduction acknowledgment message is used to indicate that the second device successfully configures the transmission rate of the second communication interface as the first transmission rate.

The second device uses the first transmission rate to send the rate reduction acknowledgment message to notify the first device that the second device also successfully changes the rate. In this way, the first device and the second device may correctly use the first transmission rate for data transmission, to avoid the case where resources are wasted due to invalid transmission when the rates of both parties are inconsistent.

According to an embodiment, after S250, 5270 may further be included. In S270, when the rate reduction acknowledgment message returned by the second device as a response to the rate reduction success message is not received by using the first transmission rate, a rate self-negotiation mode is started to negotiate the rate of the first communication interface and second communication interface with the second device.

If the first device does not receive the rate reduction acknowledgment message by using the first transmission rate, a possible cause is that the rate changing process in which the second device configures the first transmission rate is not successful, so that the rate reduction success message cannot be identified; another possible cause is that the second device successfully changes the rate but does not receive the rate reduction success message sent by the first device; a third possible cause is that the second device receives the rate reduction success message, but the sent rate reduction acknowledgment message is lost or encounters a large number of error codes during transmission. Definitely, the first device may fail to receive the rate reduction acknowledgment message due to another cause.

If the first device does not receive the rate reduction acknowledgment message, the first device and second device may re-negotiate a communication interface rate to ensure that the communication interface rates of the first device and the second device are consistent. A manner for re-negotiating the communication interface rate may use the existing rate self-negotiation mode in the prior art.

By re-negotiating the communication interface rate after rate change failure, unfavorable impact imposed by the rate change failure on data transmission may be avoided, and the normal communication status of the communication interfaces may be restored as soon as possible. When the rate self-negotiation mode in the prior art is used for rate negotiation after the rate change failure, an existing mode may be reused, to reduce the complexity of system reconstruction.

According to an embodiment, before S230, S225 may further be included. In S225, determine that the second device has the capability for identifying the rate reduction request message.

When the first device expects to work with the second device in changing the communication interface rate by means such as sending the rate reduction request message, the first device may first determine whether the second device has the capability of identifying the rate reduction request message, so as to determine whether the second device supports a dynamic rate change function. For example, the first device may send a rate change capability inquiry message to the second device to determine whether the second device is capable of changing the communication interface rate through interaction such as the rate reduction request message. When the first device receives a rate change capability acknowledgment message returned by the second device as a response to the rate change capability inquiry message, it indicates that the second device has the function for supporting rate change. In this case, the first device may send the rate reduction request message to the second device to control the communication interface rate.

In addition, according to an embodiment, before S230, S228 may further be included. In S228, suspend the first device sending a data stream. For example, when the communication interface is an Ethernet interface, to allow the first device to suspend sending data through the first communication interface, traffic control information may be sent to a module that sends data to the MAC (Media Access Control, media access control) layer and is in the first device, so that this module suspends sending the data stream to the MAC layer. For another example, if the communication interface is a CPRI, and the CPRI is set with a busy/idle flag, a control system, such as a central processor, inquires the busy/idle flag of the CPRI when needing to send data through the CPRI. If the flag indicates idle, data can be sent; otherwise, data sending is suspended. Therefore, when rate change is required, the busy/idle flag of the CPRI is set to busy, to suspend the first device in sending data stream. After the rates on the CPRIs are negotiated to be consistent, the busy/idle flag of the CPRI is set to idle, to continue data transmission. The execution sequence of S225 and S228 does not constitute restriction for the protection scope of the claims, as long as S225 and/or S228 are executed before the rate reduction request message is sent.

When the first device expects to change the communication interface rate, the first device suspends sending data externally. When rate change succeeds or both parties re-negotiate a unified communication interface rate, the first device continues to send data externally. During the process of suspending sending data, the first device caches data to be sent. When the first device can continue to send data, the cached data is sent first and then subsequent data is sent. In this way, data loss that occurs during rate change may be avoided, to ensure that the introduction of a rate change function does not affect interaction of service data when possible.

According to the method for controlling the transmission rate of the communication interface provided in this embodiment, by reducing the rate of the communication interface when the rate is lower than the first threshold, the power consumption of the communication interface may be reduced, and energy may be saved. In this way, even if data is being transmitted on the communication interface, the rate of the communication interface can still be reduced to save energy, to avoid a case where the rate of the communication interface is always in a state of high power consumption when data is being transmitted.

Figure 3A:
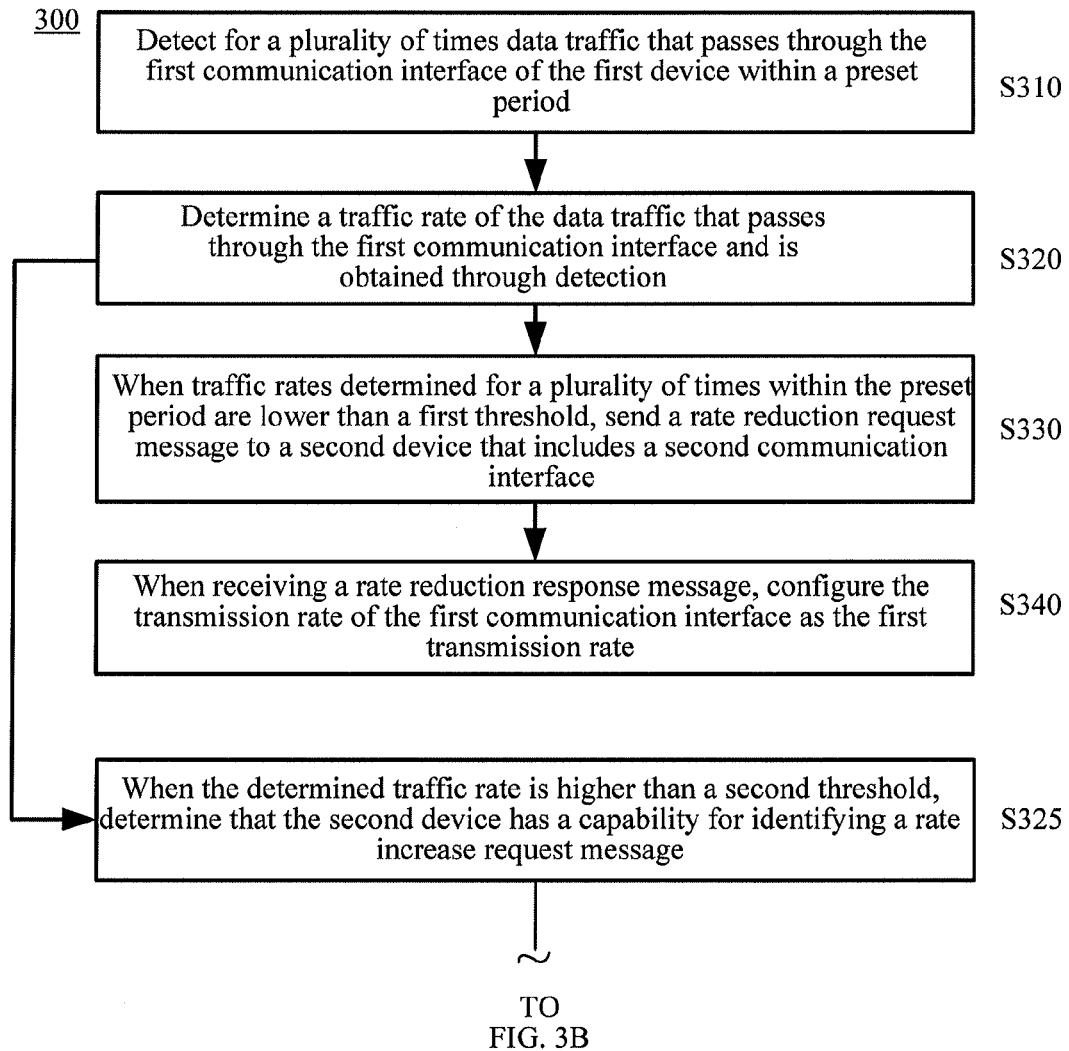
FIG. 3A and FIG. 3B are flowcharts of still another method for controlling a transmission rate of a communication interface according to an embodiment.
Figure 3B:
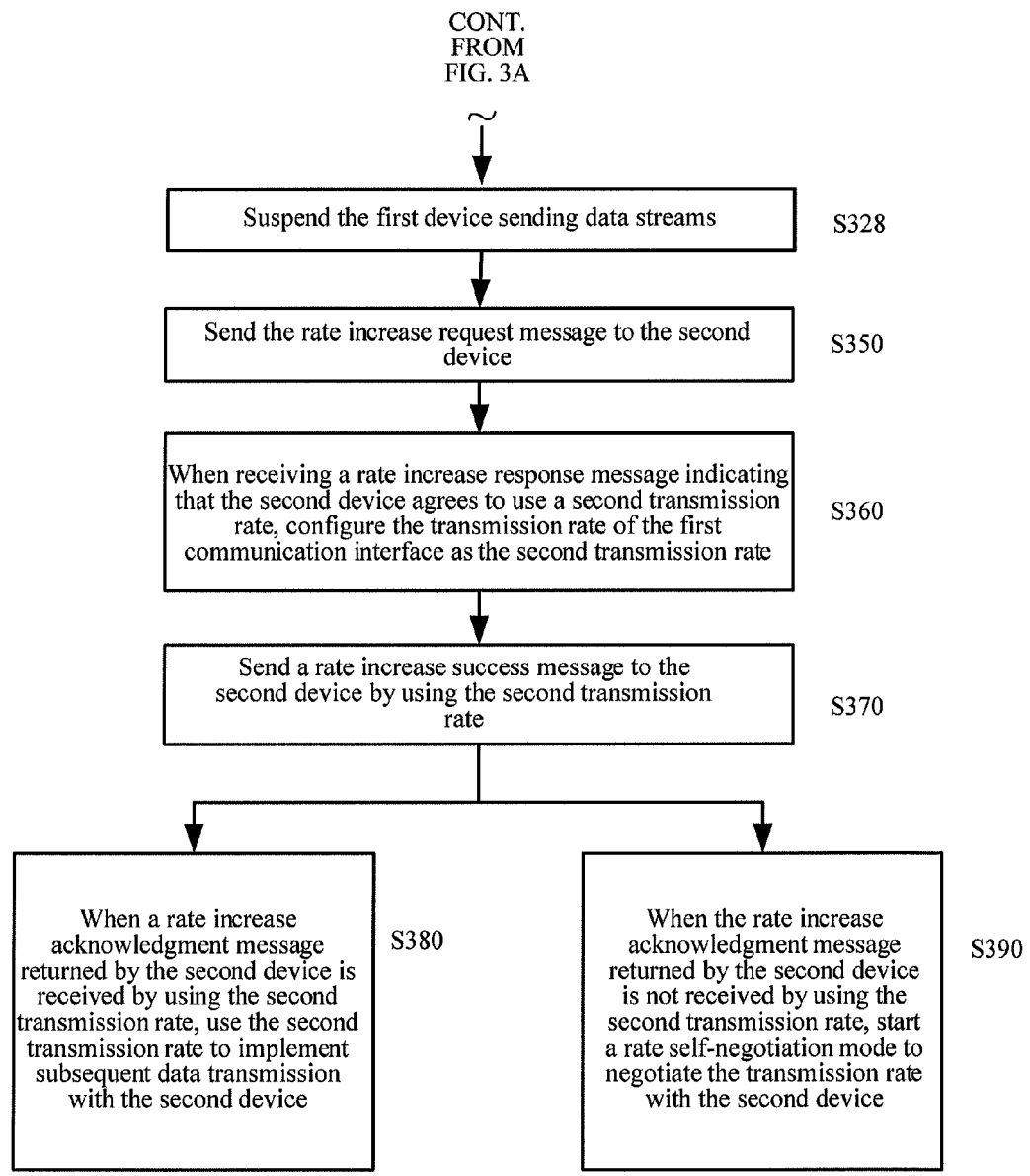

The following describes a method 300 for controlling a transmission rate of a communication interface according to an embodiment by referring to FIG. 3. A major difference between the method 300 and the method 100 is as follows: The method 300 further includes a step of improving the communication interface rate, so that self adaptation may be performed between the communication interface rate and the data traffic, thereby saving the energy and meeting requirements for data transmission when data traffic is heavy. S310 to S340 in the method 300 are basically the same as S110 to S140 in the method 100.

According to an embodiment, the method 300 further includes S350 and S360 after S320. In S350, when the detected traffic rate of the data traffic that passes through the first communication device is higher than a second threshold, send a rate increase request message to the second device, so that the second device configures the transmission rate of the second communication interface as a second transmission rate that is higher than the current transmission rate of the second communication interface and that is supported by both communication interfaces. In S360, when receiving a rate increase response message indicating that the second device agrees to use the second transmission rate, configure the transmission rate of the first communication interface as the second transmission rate.

Specifically, rate increase control may be performed once it is detected that there is a traffic rate higher than the second threshold, or be performed only when the traffic rates are higher than the second threshold for consecutive times, as long as it can be reflected that the traffic starts to increase and rate increase control is required. If rate increase control is performed once the rate is higher than the second threshold, loss of a large number of packets due to a low interface rate may be avoided.

The rate increase request message and the rate reduction request message may be collectively called rate change request messages. The first device sends a rate change request message to the second device to request the second device to perform corresponding rate change.

The rate increase response message and the rate reduction response message may be collectively called rate change response messages. Sending a rate change response message by the second device means that the second device agrees to change the rate. In this case, the second device may start to configure the rate of the second communication interface. After receiving the rate change response message, the first device starts to configure the rate of the first communication interface. The configured second transmission rate is also a transmission rate supported by the communication interfaces.

Similar to the method for setting the value of the first threshold, the second threshold is also a value drawn from experiences. In addition, those skilled in the art may easily learn that the second threshold cannot be higher than the transmission rate at this level because the traffic rate cannot be higher than the transmission rate. If the second threshold is higher than the transmission rate, rate increase adjustment will not occur.

After S360, the method 300 may further include S370. In S370, use the second transmission rate to send a rate increase success message to the second device, where the rate increase success message is used to indicate that the first device successfully configures the transmission rate of the first communication interface as the second transmission rate.

The rate increase success message and the rate reduction success message may be collectively called rate change success messages. After successfully changing the rate, the first device sends the rate change success message by using the transmission rate that undergoes rate change, to indicate to the second device that the first device successfully changes the rate and detect whether the second device successfully changes the rate.

According to an embodiment, after S370, S380 may further be included. In S380, when a rate increase acknowledgment message returned by the second device as a response to the rate increase success message is received by using the second transmission rate, use the second transmission rate to perform subsequent data transmission with the second device, where the rate increase acknowledgment message is used to indicate that the second device successfully configures the transmission rate of the second communication interface as the second transmission rate.

The rate increase acknowledgment message and the rate reduction acknowledgment message may be collectively called rate change acknowledgment messages. If the second device sends a rate change acknowledgment message, it indicates that the second device has successfully changed the transmission rate of the second communication interface, so that the rate change success message sent by the first device can be identified. After receiving the rate change acknowledgment message, the first device may determine that the second device successfully changes the rate, so that data transmission can be performed by correctly using the transmission rate that undergoes rate change, to avoid transmission failure due to inconsistency between transmission rates of both parties.

According to an embodiment, after S370, S390 may further be included. In S390, when the rate increase acknowledgment message returned by the second device as a response to the rate increase success message is not received by using the second transmission rate, start a rate self-negotiation mode to negotiate the rate of the first communication interface and second communication interface with the second device.

If the first device does not receive the rate increase acknowledgment message, the first device and the second device may use the rate self-negotiation mode in the prior art to negotiate the transmission rate, to ensure consistency between the transmission rate of the communication interface of the first device and the transmission rate of the communication interface of second device. By re-negotiating the communication interface rate after rate change failure, unfavorable impact imposed by the rate change failure on data transmission may be avoided, and the normal communication status of the communication interfaces may be restored as soon as possible. When the rate self-negotiation mode in the prior art is used for rate negotiation, an existing mode may be reused, to reduce the complexity of system reconstruction.

According to an embodiment, before S350, S325 may further be included. In S325, determine that the second device has a capability for identifying the rate increase request message.

When the first device expects to work with the second device in changing the transmission rate of the communication interface by means such as sending the rate increase request message, the first device may first determine whether the second device has the capability of identifying the rate increase request message, to determine whether the second device supports a dynamic rate change function. For example, the first device may send a rate change capability inquiry message to the second device to determine whether the second device is capable of changing the transmission rate of the communication interface through interaction such as the rate increase request message. When the first device receives a rate change capability acknowledgment message returned by the second device as a response to the rate change capability inquiry message, it indicates that the second device has the function for supporting rate change. In this case, the first device may send the rate increase request message to the second device to control the transmission rate of the communication interface.

In addition, according to an embodiment, before S350, S328 may further be included. In S328, suspend the first device in sending data streams. As described above, for example, for an Ethernet interface, traffic control information may be sent for the first device to suspend sending data streams; for a CPRI, a busy/idle flag may be set for the first device to suspend sending data streams. The execution sequence of S325 and S328 does not constitute restriction for the protection scope of the claims, as long as S325 and/or S328 are executed before the rate increase request message is sent.

When expecting to change the communication interface rate, the first device suspends sending data streams externally, and when rate change succeeds or both parties re-negotiate a unified communication interface rate, the first device continues to send data externally. During the process of suspending sending data, the data to be sent is cached. When the first device can continue to send data, the cached data is first sent and then subsequent data is sent. In this way, data loss that occurs during rate change may be avoided, to ensure that the introduction of a rate change function does not affect interaction of service data when possible.

In this way, by reducing the rate of the communication interface when the traffic rate determined according to the data traffic is low, and increasing the rate of the communication interface when the traffic rate determined according to the data traffic is high, the rate of the communication interface can be adapted to the data traffic, so that requirements for data transmission can be met and power consumption can be reduced, thereby avoiding a case where the communication interface always uses a high rate that results in high power consumption.

The inventive concept of adjusting the interface rate according to a relationship between a traffic rate corresponding to data traffic and a threshold provided in this embodiment may be used on an Ethernet interface, and may also be used on other communication interfaces equivalent to the Ethernet interface, and the power consumption of these communication interfaces can be reduced and energy can be saved when the rates of these communication interfaces are reduced. Other communication interfaces equivalent to the Ethernet interface may include but are not limited to the following interfaces: a PCIE interface, an Ethernet SerDes interface, and a wireless CPRI. In addition, the method for controlling the interface rate provided in this embodiment is implemented through interaction of two directly connected devices. The interface rate can be configured only when a device agrees on a rate change request initiated by the other device. Moreover, the first device and the second device involved in this embodiment may be specific network devices, or chip apparatuses, board apparatuses or the like inside a device.

The following describes the method for controlling a communication interface according to this embodiment with reference to a specific example. An Ethernet interface is taken as an example for the following description. However, those skilled in the art can derive that the method provided in this embodiment may also be applicable to other communication interfaces.

Figure 4:
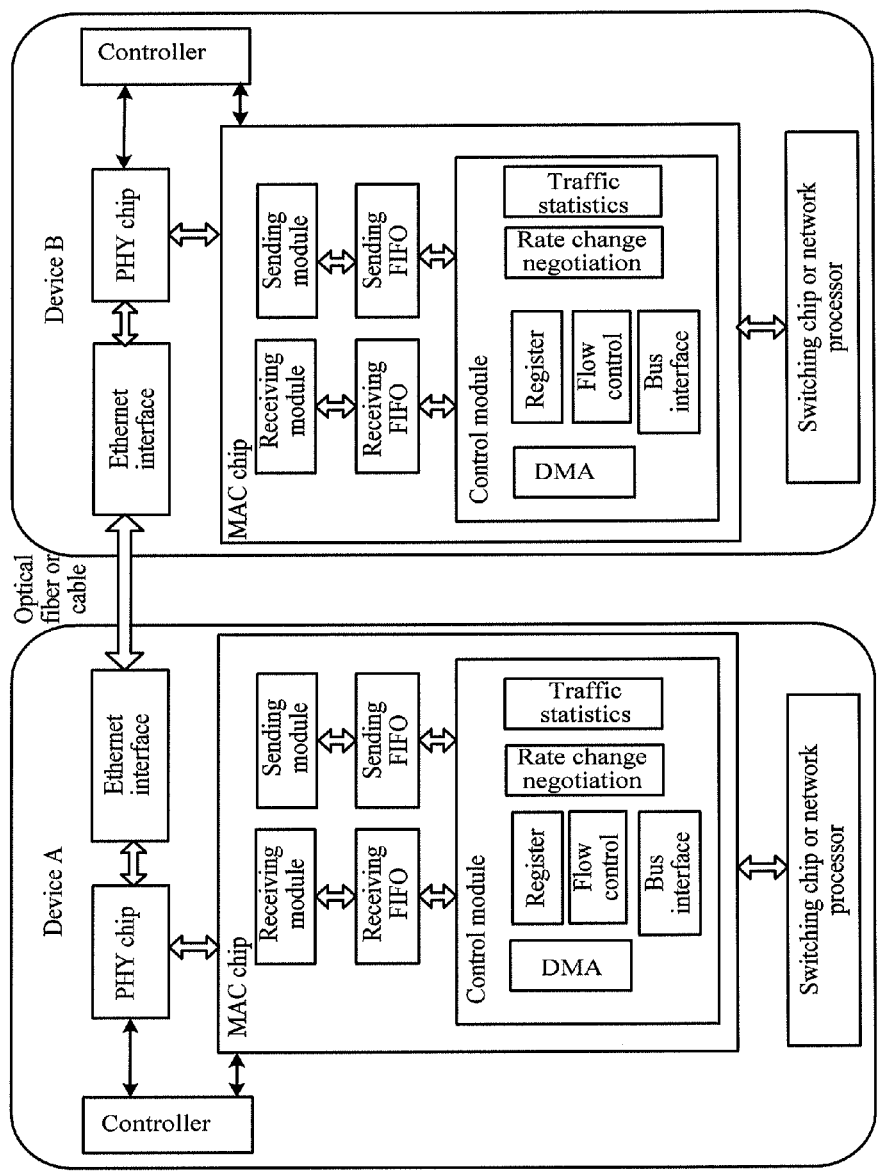
FIG. 4 is a schematic diagram of an example of internal functional modules of a first device and a second device that have Ethernet interfaces.

FIG. 4 is a schematic diagram of internal functional modules of the first device and the second device that include Ethernet interfaces. Device A is used to indicate the first device, and device B is used to indicate the second device. An Ethernet interface on device A is a first Ethernet interface, and an Ethernet interface on device B is a second Ethernet interface.

In FIG. 4, the Ethernet interface on device A is connected to the Ethernet interface on device B through an optical fiber or a cable for communication. By using the technical solution provided in this embodiment, energy on the Ethernet interfaces interconnecting device A and device B may be saved.

Device A and device B each includes an Ethernet interface module, a physical (PHY) chip, a MAC chip, a controller module, and an uplink switching chip or a network processor module. The Ethernet interface module may be an optical module or an RJ45 electrical interface. The PHY chip may implement an Ethernet physical layer function. The MAC chip may implement a function of the standard Ethernet MAC layer defined in IEEE802.3, and may also implement a function of making statistics on historical traffic and a function of negotiating and controlling interface rate change that are added in this embodiment. The controller module may implement configuration management for an Ethernet media access control layer and a physical layer. The uplink switching chip or the network processor module may implement data switching or packet processing, and determine whether traffic control frames sent by the MAC chip are received, and start traffic control operations when receiving the traffic control frames.

The MAC chip includes an existing receiving module, a sending module, a receiving first in first out (First In First Out, FIFO) queue, a sending FIFO queue, and a control module. The control module includes an existing DMA (Direct Memory Access, direct memory access), a register, a traffic control sub-module, and a bus interface. In addition, it further includes a newly added traffic statistics sub-module and a rate change negotiating sub-module.

The function of the newly added traffic statistics sub-module in the MAC chip is to automatically detect the data traffic on the Ethernet interface, and determine whether to trigger the rate change negotiating sub-module for rate change control, according to the relationship between a traffic rate calculated based on the data traffic and a threshold.

A period for detecting data traffic by the traffic statistics sub-module may be configured through a controller module. For example, the period may be 5 minutes. When the traffic statistics sub-module starts to work, the traffic statistics sub-module automatically detects the data traffic on the Ethernet interface at current time and a past period (for example, 5 minutes), and saves the maximum rate within a statistic time segment (for example, 5 minutes). For example, when the period that is for detecting the data traffic and is configured by the controller module is 5 minutes, the traffic statistics sub-module may use 1 second as a cycle for sampling the rate, use the total data traffic detected within the 1 second to divide the time length (that is, 1 second) to obtain the rate in 1 second, and save the maximum value of the rate obtained through calculation within 5 minutes. In this way, in the 5-minute statistic time segment, when the rate obtained through calculation is higher than the saved rate, the saved rate is updated as the rate currently obtained through calculation. As such, as the rate sampling time changes, the saved maximum rate may be constantly updated, so that the maximum interface rate in the latest 5-minute statistic time segment may be saved. It is assumed that in the 5-minute statistic time segment, the traffic rate that corresponds to the detected data traffic and is determined by the traffic statistics sub-module in a first 1 second is 80 Mbps, then 80 Mbps is saved; the traffic rate that corresponds to the detected data traffic and is determined in a second 1 second is 60 Mbps. As 60 Mbps is smaller than the saved 80 Mbps, 80 Mbps is still saved; the traffic rate that corresponds to the detected data traffic and is determined in a third 1 second is 100 Mbps. As 100 Mbps is higher than the saved 80 Mbps, 100 Mbps is used to replace 80 Mbps for update; In this way, as the rate sampling time moves forward, the maximum rate within the 5-minute statistic time segment may be saved.

Meanwhile, a first threshold and a second threshold are set in the traffic statistics sub-module, and are as a rate reduction threshold and a rate increase threshold, respectively. If all traffic rates determined based on the data traffic in the statistic time segment (for example, 5 minutes) are lower than the first threshold, the traffic statistics sub-module triggers the rate change negotiating sub-module to start rate change negotiation control. If one of the traffic rates that are determined based on the data traffic detected by the traffic statistics sub-module in the statistic time segment (for example, 5 minutes) is higher than the second threshold, the traffic statistics sub-module immediately triggers the rate change negotiating sub-module to start rate increase negotiation control. In addition, the traffic statistics sub-module may make statistics on the data traffic at a fixed interval, or may make statistics on the data traffic continuously.

Figure 5:
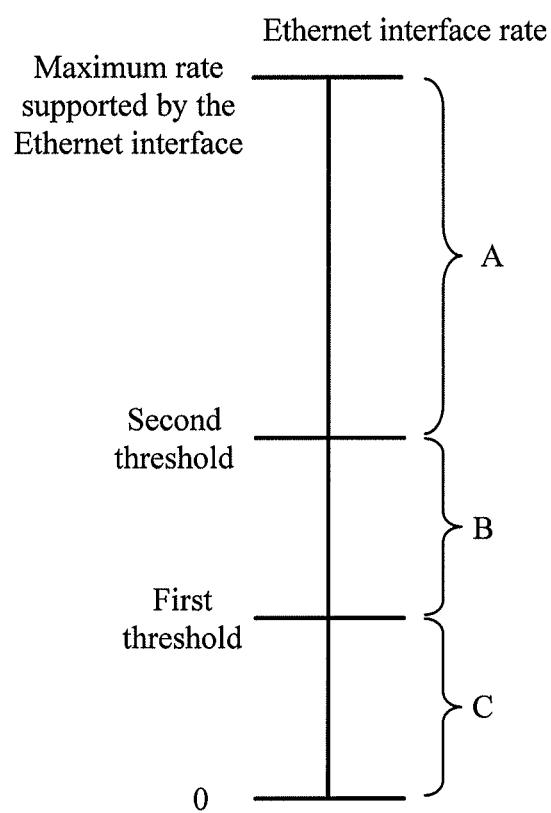
FIG. 5 is a schematic diagram of a relationship between a first threshold and a second threshold in the example shown in FIG. 4 and a maximum transmission rate supported by an Ethernet interface.

Both the first threshold and second threshold may be configured through the controller module. For example, the first threshold may be set to 3% of the maximum rate that can be supported by the Ethernet interface, and the second threshold may be set to 5% of the maximum rate that can be supported by the Ethernet interface. As an example, for a 1000 Mbps/100 Mbps Ethernet interface, the first threshold may be set to 30 Mbps, and the second threshold may be set to 50 Mbps, as shown in FIG. 5. If the current rate of the Ethernet interface is larger than the second threshold, that is, the rate of the Ethernet interface is within the region A, the rate change negotiating sub-module is immediately triggered for rate increase control; if the current rate of the Ethernet interface is between the first threshold and the second threshold, that is, the rate of the Ethernet interface is within the region B, the rate of the Ethernet interface remains unchanged; if multiple rates of the Ethernet interface that are obtained in multiple statistic time segments within a preset period are lower than the first threshold (for example, make statistics once every second, and the value of each statistic within five minutes is lower than the first threshold), that is, the rates of the Ethernet interface in the preset period are all within the region C, the rate change negotiating sub-module is triggered for rate reduction control. It should be noted that, in some cases, it is not strictly required that the rate of each statistic within the preset period needs to be lower than the first threshold, and when a few rates are larger than the first threshold (for example, the rate in one or two times among hundreds of statistics is larger than the first threshold value), it may also be deemed as "multiple rates obtained in statistic (preset) time segments are all lower than the first threshold". Specifically, those skilled in the art may determine proper error data according to actual scenarios.

After being triggered by a data traffic statistics sub-module, the rate change negotiating sub-module starts a rate change negotiation control process, and negotiates and interacts with the peer device to finally complete the rate change control on corresponding Ethernet interfaces of the devices at both ends to ensure that the Ethernet interfaces of the devices at both ends work in a latest interface mode and severe data packet loss apparent to the application layer does not occur during the rate change process.

FIG. 4 shows the first device and second device that include Ethernet interfaces. However, those skilled in the art may think of examples of internal functional modules of the first device and second device that include other communication interfaces. To implement the method for controlling the transmission rate of the communication interface according to this embodiment, a traffic statistics sub-module and a rate change negotiating sub-module need to be added internally to the devices. For example, for the first device and second device that include CPRIs, the traffic statistics sub-module and the rate change negotiating sub-module need to be added at layer 2 (layer2). The traffic statistics sub-module makes statistics on data traffic received and data traffic sent at layer 2 within the statistic time segment (for example, 1 second), selects the maximum value in the data traffic received and data traffic sent within the statistic time segment, and divides the maximum value by the length of the statistic time segment to obtain the rate within the statistic time segment.

Figure 6A:
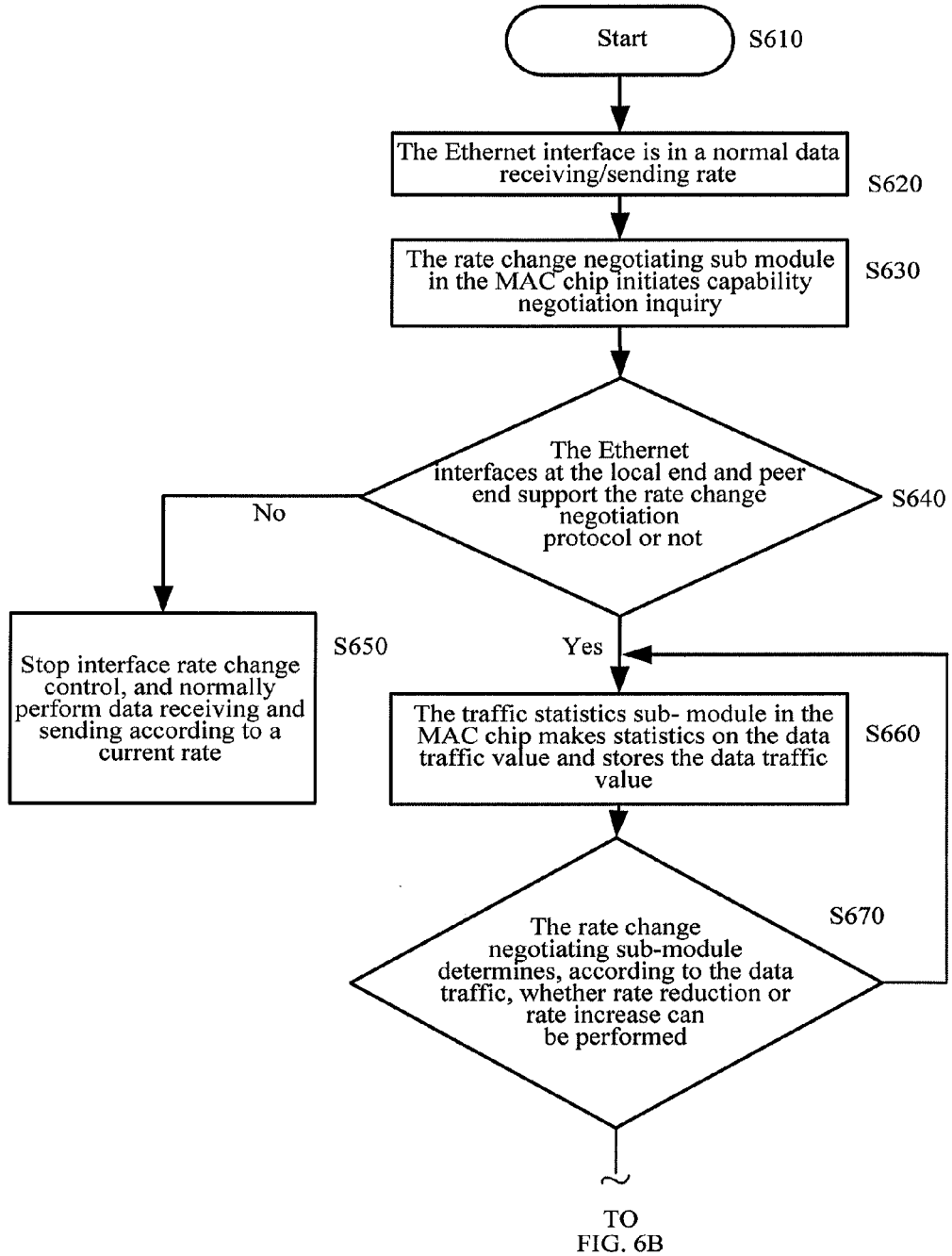
FIG. 6 is a flowchart of a method for controlling a transmission rate of an Ethernet interface in the example shown in FIG. 4.
Figure 6B:
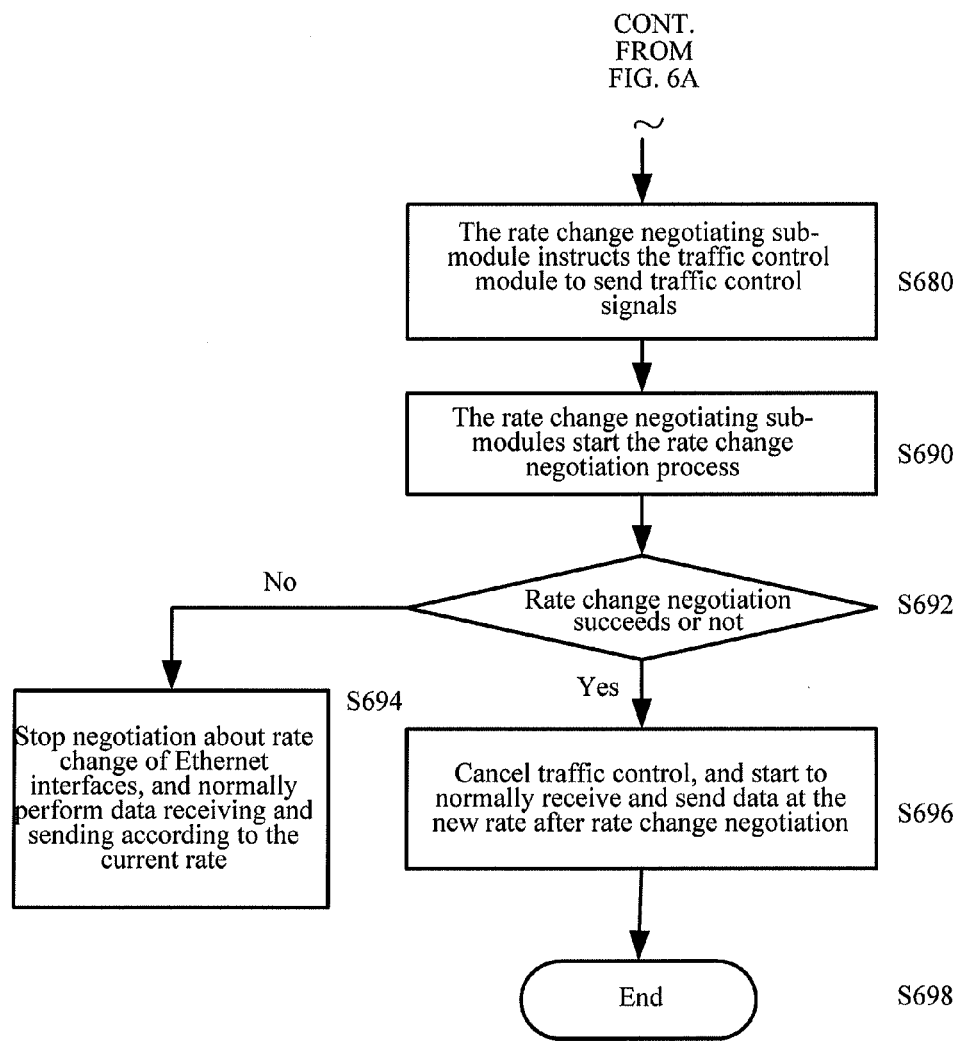

Device A and device B shown in FIG. 4 may control the rates of Ethernet interfaces through the flowchart shown in FIG. 6. In the process of controlling the rates of Ethernet interfaces, the rate reduction request message, the rate reduction response message, the rate reduction success message, the rate reduction acknowledgment message, the rate increase request message, the rate increase response message, the rate increase success message, and the rate increase acknowledgment message that are involved in methods 100 to 300 may all be implemented by using Ethernet frames. Therefore, they may be called a rate reduction request frame, a rate reduction response frame, a rate reduction success frame, a rate reduction acknowledgment frame, a rate increase request frame, a rate increase response frame, a rate increase success frame, and a rate increase acknowledgment frame, respectively.

In S610, the process of controlling the rates of Ethernet interfaces starts.

In S620, the Ethernet interfaces are in a normal data receiving and sending state. The Ethernet interface of device A and the Ethernet interface of device B perform normal data transmission.

In S630, the rate change negotiating sub-module in the MAC chip of device A initiates capability negotiation inquiry to acquire whether the Ethernet interfaces at a local end and a peer end support a rate change negotiation protocol, that is, determine whether the Ethernet interfaces at the local end and peer end are capable of changing the rates of the Ethernet interfaces according to interaction, such as a rate change request frame. As stated earlier, the sending of the rate change request frame is decided based on the traffic rate determined by the detected data traffic.

In S640, device A determines whether the Ethernet interfaces at both the local end and peer end support the rate change negotiation protocol or not.

If at least one of the Ethernet interfaces at both the local end and peer end does not support the rate change negotiation protocol, in S650 device A stops interface rate change control, and performs normal data receiving and sending according to a current Ethernet interface rate.

If the Ethernet interfaces at both the local end and peer end support the rate change negotiation protocol, in 5660 the traffic statistics sub-module in the MAC chip of device A makes statistics on data traffic on the Ethernet interface of device A within a historical period of time, calculates the traffic rate according to the data traffic, and stores the rate.

In S670, the rate change negotiating sub-module in the MAC chip of device A determines whether the Ethernet interface rate can be reduced or increased according to the rate determined by the traffic statistics sub-module.

If the rate change negotiating sub-module determines not to change the rate, return to S660; otherwise, proceed to S680.

In S680, the rate change negotiating sub-module in the MAC chip of each of device A and device B instructs a traffic control module to send a traffic control signal to an uplink switching chip or a network processor at its respective local end. Through the traffic control signal, the uplink switching chip or the network controller can be instructed to suspend sending a data packet to the MAC layer, to avoid data loss.

Figure 7:
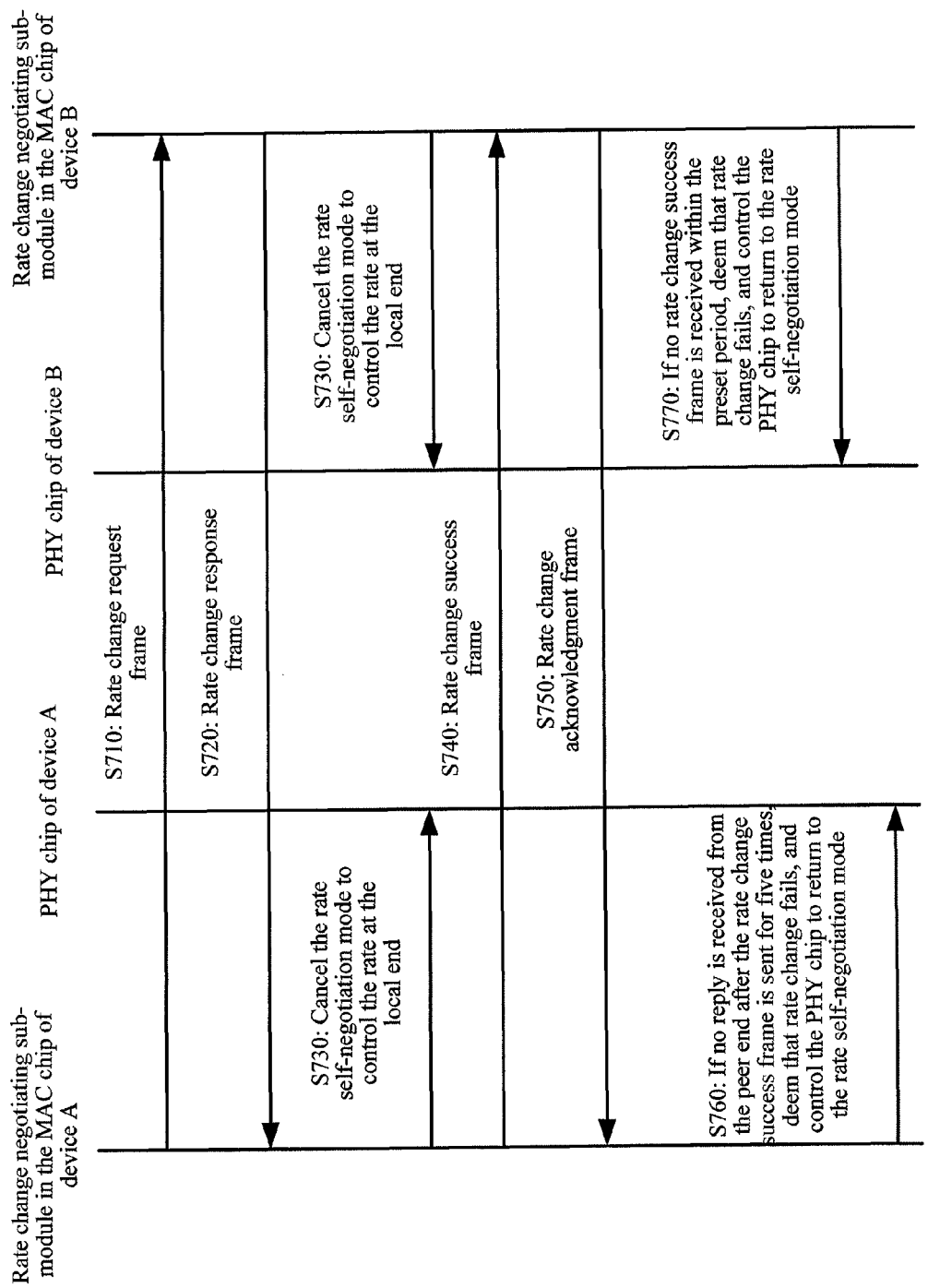
FIG. 7 is a schematic diagram of an interaction process of negotiating a transmission rate of the Ethernet interfaces by the first device and the second device in the example shown in FIG. 4.

In S690, the rate change negotiating sub-modules in the MAC chips of device A and device B start the rate change negotiation process. This process may be as shown in FIG. 7 described in the following.

In S692, device A determines whether rate change negotiation succeeds or not.

If rate change negotiation fails, in 5694 device A and device B stop negotiation about rate change of Ethernet interfaces, and normally perform data receiving and sending according to the current rate.

If the rate change negotiation succeeds, in 5696 traffic control is cancelled and data receiving and sending are normally performed at the new rate after rate change negotiation.

In S698, the process ends.

It should be noted that, as shown in S690, before rate change control is started, to ensure that no severe data packet loss or congestion occurs on the Ethernet interface during the rate change process, the rate change negotiating sub-module of device A may send a flow control frame to an uplink port (for example, a network processor or a switching chip) at the local end before rate change control starts, so as to ensure that an uplink chip suspends sending data packets to the MAC layer during the rate change process, thereby avoiding data loss. Likewise, after receiving the request for rate change control, device B may also send a flow control frame to the uplink switching chip or network controller at the local end. In this way, it may be ensured that devices at both ends suspend sending data to the Ethernet interfaces during the rate change process.

The negotiation and interaction process between rate change negotiating sub-modules of device A and device B in S690 may be as shown in FIG. 7.

In S710, the rate change negotiating sub-module in the MAC chip of device A sends a rate change request frame to the rate change negotiating sub-module in the MAC chip of device B to request the peer end to start rate change.

In S720, the rate change negotiating sub-module in the MAC chip of device B responds to the rate change request frame for device A, and sends a rate change response frame.

In S730, after the response succeeds, the rate change negotiating sub-modules at both ends start switching control for the Ethernet interface rate at their respective local ends, for example, control the PHY chips of their respective ends to cancel the rate self-negotiation mode in the prior art and configure a new interface rate for the Ethernet interfaces.

In S740, after switching succeeds, the rate change negotiating sub-module of device A sends a rate change success frame to the rate change negotiating sub-module of device B by using the Ethernet interface rate that undergoes rate change. This frame may be sent for consecutive times (for example, five times). After rate change at the local end succeeds, the rate change negotiating sub-module of the peer device may send, by using the Ethernet interface rate after rate change, a rate change acknowledgment frame indicating that device B successfully changes the rate, as long as it receives the rate change success frame once.

In S750, the rate change negotiating sub-module of device B receives the rate change success frame, and sends a rate change acknowledgment frame to the rate change negotiating sub-module of device A. This frame may also be sent for consecutive times (for example, five times). Device A may determine that device B successfully changes the rate, as long as device A receives the rate change acknowledgment frame once. If device A receives the rate change acknowledgment frame sent by device B, it indicates that both parties successfully complete rate change negotiation control, and the Ethernet interfaces are capable of working at the new rate.

If device A detects that rate change control at the local end fails, device A restores the Ethernet interface rate at the local end to the state before rate change, and does not send the rate change success frame to device B in S740. If the rate change negotiating sub-module of device B detects that rate change at the local end fails, it also restores the Ethernet interface rate at the local end to the state before rate change, and does not reply to the rate change success frame sent by device A.

In addition, if device A does not receive the rate change acknowledgment frame sent by device B, device A determines that rate change fails, and in S760 controls the PHY chip to return to the rate self-negotiation mode in an existing Ethernet technology.

If device B does not receive, within a preset period, the rate change success frame sent by device A, device B determines that rate change fails, and in S770 controls the PHY chip to return to the rate self-negotiation mode.

The rate change request frame, the rate change response frame, the rate change success frame, and the rate change acknowledgment frame that are sent in the interaction process use the form of Ethernet frames, and therefore the Ethernet frame types related to new frames need to be added based on the Ethernet frames defined in existing standards. In addition to the new frames, an Ethernet rate change capability inquiry frame and an Ethernet rate change capability response frame may be added. Through the two frames, device A can determine whether device B supports the rate change negotiation function introduced in this embodiment.

New Ethernet frames in this embodiment may be differentiated by specifying different values for the type fields of Ethernet frames. The following values are only examples, and do not confine the present application. For example, 0X9F01 may be carried in a type field to indicate a rate change request frame, 0X9F02 may be carried in a type field to indicate a rate change response frame, 0X9F03 may be carried in a type field to indicate a rate change success frame, 0X9F04 may be carried in a type field to indicate a rate change acknowledgment frame, 0X9F05 may be carried in a type field to indicate an Ethernet rate change capability inquiry frame, and 0X9F06 may be carried in a type field to indicate an Ethernet rate change capability response frame. Whether the rate change request frame, the rate change response frame, the rate change success frame, and the rate change acknowledgment frame are specifically related to rate reduction or are related to rate increase may be differentiated through the information carried in an Ethernet data part, or the type field may be re-encoded to reflect whether they are related to rate reduction or are related to rate increase.

When the method for controlling the transmission rate of the communication interface provided in this embodiment is applied on an Ethernet interface, it is implemented that the Ethernet interface selects a proper interface rate automatically according to the detected data traffic, thereby avoiding a current case where Ethernet interfaces always work at the highest rate mode supported by both parties, and implementing automatic energy saving of Ethernet interfaces. In addition, through the rate change negotiation control process of hardware and a flow control mechanism, data loss during a rate switching process is avoided. As the Ethernet interface rate constantly increases and Ethernet interfaces are widely used, the energy saving effect brought by rate reduction control of Ethernet interfaces will become more and more obvious.

Figure 8:
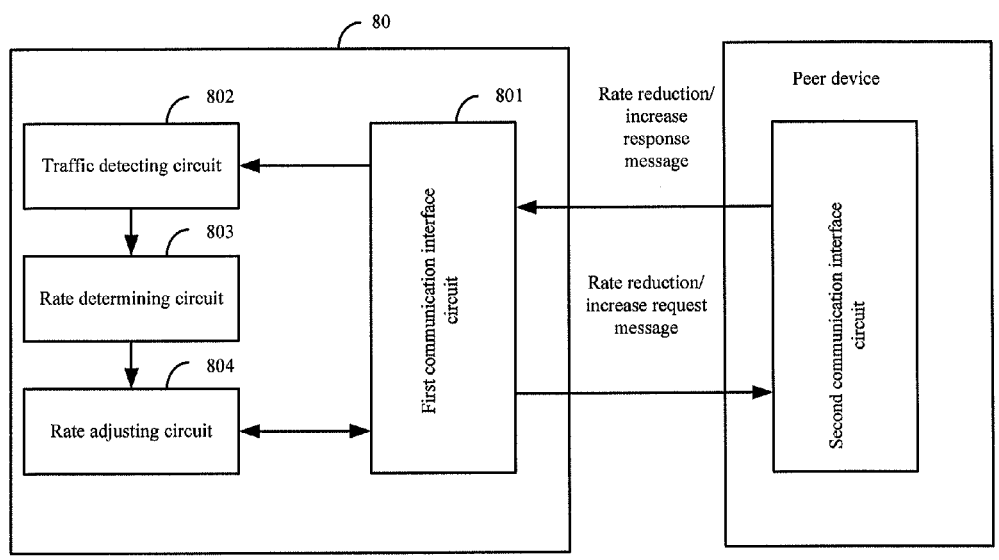
FIG. 8 is a structural block diagram of a network device according to an embodiment.

Based on the preceding embodiments, an embodiment provides a network device. FIG. 8 is a structural diagram of a network device 80 according to an embodiment. The network device includes: a first communication interface circuit 801, a traffic detecting circuit 802, a rate determining circuit 803, and a rate adjusting circuit 804.

The first communication interface circuit 801 is configured to connect to a second communication interface circuit of a peer device and transmit data through the communication interface circuits, where the first communication interface circuit and the second communication interface circuit support adjustment among a plurality of transmission rates.

The traffic detecting circuit 802 is configured to detect, for a plurality of times, data traffic that passes through the first communication interface circuit within a preset period.

The rate determining circuit 803 is configured to determine a traffic rate of the data traffic that passes through the first communication interface and that is obtained through detection.

The rate adjusting circuit 804 is configured to, when the traffic rates determined for a plurality of times within the preset period is lower than a first threshold, send a rate reduction request message through the first communication interface circuit to a peer device, so that the peer device configures a transmission rate of the second communication interface circuit as a first transmission rate that is lower than a current transmission rate of the second communication interface and that is supported by both communication interface circuits after the peer device receives the rate reduction request message. The rate adjusting circuit 804 is further configured to receive, through the first communication interface circuit, a rate reduction response message of agreeing to use the first transmission rate, where the rate reduction response message is sent by the peer device after the peer device receives the rate reduction request message; and configure a transmission rate of the first communication interface circuit as the first transmission rate after receiving the rate reduction response message.

For example, when the communication interface is an Ethernet interface, the first communication interface circuit may be implemented through the Ethernet interface module as shown in FIG. 4, and the traffic detecting circuit 802, the rate determining circuit 803, and the rate adjusting circuit may be implemented through the MAC chip as shown in FIG. 4. Specifically, the traffic detecting circuit 802 and the rate determining circuit 803 may be implemented through the traffic statistics sub-module as shown in FIG. 4, and the rate adjusting circuit 804 may be implemented through the rate change negotiating sub-module as shown in FIG. 4.

For the preceding and other operations and/or functions of the first communication interface circuit 801, the traffic detecting circuit 802, the rate determining circuit 803 and the rate adjusting circuit 804, reference can be made to the descriptions in the method 100 and relevant parts, and details are not described herein again to avoid repetition.

According to the network device provided in this embodiment, by reducing the rate of the communication interface when multiple rates determined within a preset period are lower than the first threshold, the power consumption of the communication interface may be reduced, and energy may be saved. In this way, even if data is being transmitted on the communication interface, energy saving can still be implemented by reducing the rate of the communication interface, to avoid a case where the rate of the communication interface is always in a state of high power consumption when data is being transmitted.

According to the embodiment, the rate adjusting circuit 804 is further configured to send a rate reduction success message to the peer device by using the first transmission rate, where the rate reduction success message is used to indicate that the network device 80 successfully configures the rate of the first communication interface as the first transmission rate. When a rate reduction acknowledgment message returned by the peer device as a response to the rate reduction success message is received by using the first transmission rate, subsequent data transmission is performed with the peer device by using the first transmission rate, where the rate reduction acknowledgment message is used to indicate that the peer device successfully configures the rate of the second communication interface as the first transmission rate; or when the rate reduction acknowledgment message returned by the peer device as a response to the rate reduction success message is not received by using the first transmission rate, a rate self-negotiation mode is started to negotiate the rate of the first communication interface and second communication interface with the peer device.

In this way, by using the rate reduction success message and the rate reduction acknowledgment message, it may be ensured that a first device and a second device correctly use the first transmission rate for data transmission, to avoid a case where resources are wasted due to invalid transmission when the rates of both parties are inconsistent. In addition, by re-negotiating the communication interface rate after rate change failure, unfavorable impact imposed by the rate change failure on data transmission may be avoided, and the normal communication status of the communication interfaces may be restored as soon as possible. When the rate self-negotiation mode in the prior art is used for rate negotiation after the rate change failure, an existing mode may be reused, to reduce the complexity of system reconstruction.

According to an embodiment, the rate adjusting circuit 804 is further configured to determine that the peer device has the capability for identifying the rate reduction request message, before sending the rate reduction request message.

In this way, the method provided in this embodiment may be used only when the peer device is capable of identifying the rate reduction request message, so as to avoid a waste of resources.

According to the embodiments, the rate adjusting circuit 804 is further configured to suspend the network device 80 in sending a data stream, and after suspending the network device 80 in sending the data stream, send the rate reduction request message through the first communication interface circuit to the peer device.

In this way, a case where data is lost during rate change may be avoided, so that the introduction of a rate change function does not affect interaction of service data when possible.

By reducing the rate of the communication interface when the rate is lower than the first threshold, the power consumption of the communication interface may be reduced, thereby saving energy. In this way, even if data is being transmitted on the communication interface, energy can still be saved by reducing the rate of the communication interface, to avoid a case where the rate of the communication interface is always in the state of high power consumption when data is being transmitted.

According to an embodiment, the rate adjusting circuit 804 is further configured to send a rate increase request message to the peer device when the traffic rate at which the data traffic passes through the first communication interface circuit is higher than a second threshold, so that the peer device configures the transmission rate of the second communication interface as a second transmission rate that is higher than the current transmission rate of the second communication interface and that is supported by both communication interface circuits; and configure the rate of the first communication interface as the second transmission rate when a rate increase response message indicating that the peer device agrees to use the second transmission rate is received.

According to the embodiment, the rate adjusting circuit 804 is further configured to send a rate increase success message to the peer device by using the second transmission rate, where the rate increase success message is used to indicate that the network device 80 successfully configures the rate of the first communication interface as the second transmission rate. When a rate increase acknowledgment message returned by the peer device as a response to the rate increase success message is received by using the second transmission rate, subsequent data transmission is implemented with the peer device by using the second transmission rate, where the rate increase acknowledgment message is used to indicate that the peer device successfully configures the rate of the second communication interface as the second transmission rate; or when the rate increase acknowledgment message returned by the peer device as a response to the rate increase success message is not received by using the second transmission rate, the rate self-negotiation mode is started to negotiate the rate of the first communication interface and second communication interface with the peer device.

In this way, by using the rate increase success message and the rate increase acknowledgment message, it may be ensured that the first device and the second device correctly use the second transmission rate for data transmission, to avoid a case where resources are wasted due to invalid transmission when the rates of both parties are inconsistent. In addition, by re-negotiating the communication interface rate after rate change failure, unfavorable impact imposed by the rate change failure on data transmission may be avoided, and the normal communication status of the communication interfaces may be restored as soon as possible. When the rate self-negotiation mode in the prior art is used for rate negotiation after the rate change failure, an existing mode may be reused, to reduce the complexity of system reconstruction.

According to an embodiment, the rate adjusting circuit 804 is further configured to determine that the peer device has the capability for identifying the rate increase request message.

In this way, the method provided in this embodiment may be used only when the peer device is capable of identifying the rate increase request message, to avoid waste of resources.

According to an embodiment, the rate adjusting circuit 804 is further configured to suspend the network device 80 in sending a data stream, and after suspending the network device 80 in sending the data stream, send the rate increase request message through the first communication interface circuit to the peer device.

In this way, a case where data is lost during rate change may be avoided, so that the introduction of the rate change function does not affect interaction of service data when possible.

For the preceding and other operations and/or functions of the rate adjusting circuit 804, reference can be made to the corresponding parts of the methods 200 and 300, and with reference to the examples described in FIG. 4 to FIG. 7, the content can be better understood. To avoid repetition, details are not described herein again.

By reducing the transmission rate of the communication interface when the traffic rate determined according to the data traffic is low, and increasing the rate of the communication interface when the traffic rate determined according to the data traffic is high, self adaptation can be performed between the rate of the communication interface and the data traffic, so that requirements for data transmission can be met and power consumption can be reduced, thereby avoiding a case where the communication interface always uses a high rate that results in high power consumption.

Those skilled in the art may realize that, steps of the method and units described in the embodiments disclosed in this specification can be implemented by using electronic hardware, computer software, or a combination of the electronic hardware and computer software. To clearly describe the exchangeability between hardware and software, the steps and components of each embodiment are generally described according to functions in the preceding description. Whether the functions are executed by using hardware or executed by software depends on the specific applications and design constraints of the technical solutions. Those skilled in the art may use different methods to implement the described functions for each specific application. Such implementation, however, should not be construed as beyond the scope of the claims.

The steps in the method described in the embodiments disclosed in the specification may be implemented based on various hardware components. For example, a typical hardware architecture includes a processor, a memory, and relevant interface circuits. The processor is configured to execute corresponding programs, the memory is configured to store codes of the programs or further store some data generated during processing, and the interface circuits are configured to implement communication between devices. Selection of specific types of hardware may be determined according to actual applications. Those techniques are common knowledge for those skilled in the art and are not described here. Software programs may be placed in a random access memory (RAM), a memory, a read-only memory (ROM), an electrically programmable ROM, an electrically erasable and programmable ROM, a register, a hard disk, a mobile disk, a CD-ROM, or any other form of storage medium known to those skilled in the art.

Although some embodiments have been presented and described above, those skilled in the art should understand that various modifications may be made to these embodiments without departing from the principles and ideas of the claims, and such modifications shall fall within the scope of the claims.

What is claimed is:

1. A method for controlling a transmission rate of a communication interface, comprising:
    detecting, for a plurality of times, data traffic that passes through a first communication interface of a first device within a preset period, wherein the communication interface supports adjustment among a plurality of transmission rates;
    determining a traffic rate of the detected data traffic;
    when traffic rates determined for the plurality of times within the preset period are lower than a first threshold, sending a rate reduction request message to a second device that includes a second communication interface, so that the second device configures a transmission rate of the second communication interface as a first transmission rate that is lower than a current transmission rate of the second communication interface and is supported by both communication interfaces after the second device receives the rate reduction request message, wherein the second communication interface and the first communication interface are located at two ends of a link for data transmission, respectively; and
    receiving a rate reduction response message that indicates an agreement to use the first transmission rate, wherein the rate reduction response message is sent by the second device after receiving the rate reduction request message; and
    configuring a transmission rate of the first communication interface as the first transmission rate after receiving the rate reduction response message; and
    after configuring the transmission rate of the first communication interface as the first transmission rate, sending a rate reduction success message at the first transmission rate to the second device, wherein the rate reduction success message is used to indicate that the first device successfully configured the transmission rate of the first communication interface as the first transmission rate;
    when a rate reduction acknowledgment message returned by the second device as a response to the rate reduction success message is received by using the first transmission rate, communicating subsequent data transmission with the second device at the first transmission rate, wherein the rate reduction acknowledgment message is used to indicate that the second device successfully configured the transmission rate of the second communication interface as the first transmission rate; and
    when a rate reduction acknowledgment message returned by the second device as a response to the rate reduction success message is not received by using the first transmission rate, starting a rate self-negotiation mode to negotiate a transmission rate of the first communication interface and second communication interface with the second device.

2. The method according to claim 1, wherein before sending the rate reduction request message to the second device that includes the second communication interface, the method further comprises:
    determining that the second device has a capability for identifying the rate reduction request message.

3. The method according to claim 1, wherein before sending the rate reduction request message to the second device that includes the second communication interface, the method further comprises:
    suspending the first device in sending a data stream.

4. The method according to claim 1, wherein after determining the transmission rate of the first communication interface according to the data traffic, the method further comprises:

when the traffic rate at which the data traffic passes through the first communication interface is higher than a second threshold, sending a rate increase request message to the second device, so that the second device configures the transmission rate of the second communication interface as a second transmission rate that is higher than the current transmission rate of the second communication interface and is supported by both communication interfaces; and when a rate increase response message indicating that the second device agrees to use the second transmission rate is received, configuring the transmission rate of the first communication interface as the second transmission rate.

5. The method according to claim 4, wherein after configuring the transmission rate of the first communication interface as the second transmission rate, the method further comprises:

sending a rate increase success message to the second device at the second transmission rate, wherein the rate increase success message is used to indicate that the first device successfully configures the transmission rate of the first communication interface as the second transmission rate; and when a rate increase acknowledgment message returned by the second device as a response to the rate increase success message is received by using the second transmission rate, communicating subsequent data transmission with the second device at the second transmission rate, wherein the rate increase acknowledgment message is used to indicate that the second device successfully configures the transmission rate of the second communication interface as the second transmission rate; and when a rate increase acknowledgment message returned by the second device as a response to the rate increase success message is not received by using the second transmission rate, starting a rate self-negotiation mode to negotiate a transmission rate of the first communication interface and second communication interface with the second device.

6. The method according to claim 4, wherein before sending the rate increase request message to the second device, the method further comprises:

determining that the second device has a capability for identifying the rate increase request message.

7. The method according to claim 4, wherein, before sending the rate increase request message to the second device, the method further comprises:

suspending the first device in sending a data stream.

8. A network device, comprising:

a first communication interface circuit configured to connect to a second communication interface circuit of a peer device and transmit data with the peer device through the second communication interface circuit, wherein the first communication interface circuit and the second communication interface circuit support a plurality of transmission rates;

a traffic detecting circuit configured to detect, for a plurality of times, data traffic that passes through the first communication interface circuit within a preset period;

a rate determining circuit configured to determine a detected traffic rate of the data traffic that passes through the first communication interface circuit; and a rate adjusting circuit configured to, when the traffic rates determined for a plurality of times within the preset period are lower than a first threshold, send a rate reduction request message through the first communication interface circuit to the peer device, so that the peer device configures a transmission rate of the second communication interface circuit as a first transmission rate that is lower than a current transmission rate of the second communication interface and is supported by both communication interface circuits after the peer device receives the rate reduction request message;

wherein the rate adjusting circuit is further configured to receive, through the first communication interface circuit, a rate reduction response message that indicates an agreement to use the first transmission rate, wherein the rate reduction response message is sent by the peer device after receiving the rate reduction request message; and configure a transmission rate of the first communication interface circuit as the first transmission rate after receiving the rate reduction response message;

wherein the rate adjusting circuit is further configured to send a rate reduction success message to the peer device at the first transmission rate, wherein the rate reduction success message is used to indicate that the network device successfully configured the transmission rate of the first communication interface as the first transmission rate; and the rate adjusting circuit is further configured to, when a rate reduction acknowledgment message returned by the peer device as a response to the rate reduction success message is received by using the first transmission rate, communicate subsequent data transmission with the peer device at the first transmission rate, wherein the rate reduction acknowledgment message is used to indicate that the peer device successfully configured the transmission rate of the second communication interface as the first transmission rate; and when a rate reduction acknowledgment message returned by the peer device as a response to the rate reduction success message is not received by using the first transmission rate, start a rate self-negotiation mode to negotiate a transmission rate of the first communication interface and second communication interface with the peer device.

9. The network device according to claim 8, wherein the rate adjusting circuit is further configured to determine that the peer device has a capability for identifying the rate reduction request message.

10. The network device according to claim 8, wherein the rate adjusting circuit is further configured to suspend the network device in sending a data stream, and after suspending the network device in sending the data stream, send the rate reduction request message to the peer device through the first communication interface circuit.

11. The network device according to claim 8, wherein the rate adjusting circuit is further configured to, when the traffic rate at which the data traffic passes through the first communication interface circuit is higher than a second threshold, send a rate increase request message to the peer device, so that the peer device configures the transmission rate of the second communication interface as a second transmission rate that is higher than the current transmission rate of the second communication interface and that is supported by both communication interface circuits; and the rate adjusting circuit is further configured to, when a rate increase response message indicating that the peer device agrees to use the second transmission rate is received, configure the transmission rate of the first communication interface as the second transmission rate.

12. The network device according to claim 11, wherein the rate adjusting circuit is further configured to send a rate increase success message to the peer device at the second transmission rate, wherein the rate increase success message is used to indicate that the network device successfully configures the transmission rate of the first communication interface as the second transmission rate; and the rate adjusting circuit is further configured to, when a rate increase acknowledgment message returned by the peer device as a response to the rate increase success message is received by using the second transmission rate, communicate subsequent data transmission with the peer device the second transmission rate, wherein the rate increase acknowledgment message is used to indicate that the peer device successfully configured the transmission rate of the second communication interface as the second transmission rate; and when a rate increase acknowledgment message returned by the peer device as a response to the rate increase success message is not received by using the second transmission rate, start a rate self-negotiation mode to negotiate a transmission rate of the first communication interface and second communication interface with the peer device.

13. The network device according to claim 11, wherein the rate adjusting circuit is further configured to determine that the peer device has a capability for identifying the rate increase request message.

14. The network device according to claim 11, wherein the rate adjusting circuit is further configured to suspend the network device in sending a data stream, and after suspending the network device in sending the data stream, send the rate increase request message to the peer device through the first communication interface circuit.

* * * * *